(12) United States Patent
Boure et al.

(10) Patent No.: US 7,829,192 B2
(45) Date of Patent: Nov. 9, 2010

(54) ACOUSTIC LAMINATED GLAZING, ACOUSTIC INTERLAYER AND METHOD FOR SELECTING THE INTERLAYER FOR OPTIMAL ACOUSTIC DAMPING

(75) Inventors: Jean-Philippe Boure, Ribecourt (FR); Julien Charlier, Chateau Thierry (FR); Eloi Gaudry, Wolluwe St Lambert (BE); Marc Rehfeld, Ezanville (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/296,440

(22) PCT Filed: May 10, 2007

(86) PCT No.: PCT/FR2007/051246
§ 371 (c)(1),
(2), (4) Date: Oct. 8, 2008

(87) PCT Pub. No.: WO2007/135317
PCT Pub. Date: Nov. 29, 2007

(65) Prior Publication Data
US 2009/0159362 A1 Jun. 25, 2009

(30) Foreign Application Priority Data
May 19, 2006 (FR) .................. 06 51849

(51) Int. Cl.
B32B 17/10 (2006.01)
C03C 27/12 (2006.01)
G10K 11/168 (2006.01)
B60R 13/08 (2006.01)

(52) U.S. Cl. .................. 428/437; 181/289; 181/290; 428/212; 428/436

(58) Field of Classification Search .................. 428/436, 428/437, 212; 181/289, 290
See application file for complete search history.

(56) References Cited
U.S. PATENT DOCUMENTS

| 5,190,826 A | 3/1993 | Asahina et al. ............. 428/437 |
| 5,796,055 A | 8/1998 | Benson, Jr. et al. ......... 181/208 |
| 6,074,732 A | 6/2000 | Garnier et al. .............. 428/215 |

(Continued)

FOREIGN PATENT DOCUMENTS
EP     0 844 075     5/1998

(Continued)

Primary Examiner—D. S Nakarani
(74) Attorney, Agent, or Firm—Oblon, Spivak, McClelland, Maier & Neustadt, L.L.P.

(57) ABSTRACT

Laminated glazing (2) comprising a viscoelastic plastic insert (3) comprising at least two damping films (30, 31) each having a loss factor tan δ greater than 0.6 and a shear modulus G' less than $2 \times 10^7$ Pa over two temperature ranges $t_A$ et $t_B$ respectively, characterized in that the film which has, at a frequency of 200 Hz, the highest loss factor tan δ over a given temperature range included within the temperature range $t_A$ or $t_B$, has an equivalent shear modulus $G'_{eq}$ less than the equivalent shear modulus or moduli of the other film or films, with $$G'_{eq} = G' \frac{e_{tot}}{e}$$

where G' is the shear modulus of the material constituting the film, e is the thickness of the film and $e_{tot}$ the total thickness of the insert.

17 Claims, 2 Drawing Sheets

U.S. PATENT DOCUMENTS

| | | | |
|---|---|---|---|
| 6,119,807 A | 9/2000 | Benson, Jr. et al. | 181/208 |
| 6,432,522 B1 | 8/2002 | Friedman et al. | 428/212 |
| 2003/0139520 A1 | 7/2003 | Toyama et al. | 524/503 |
| 2005/0170160 A1* | 8/2005 | Moran et al. | 428/214 |
| 2006/0008658 A1 | 1/2006 | Fukatani et al. | 428/437 |

FOREIGN PATENT DOCUMENTS

EP    1 281 690    2/2003

* cited by examiner

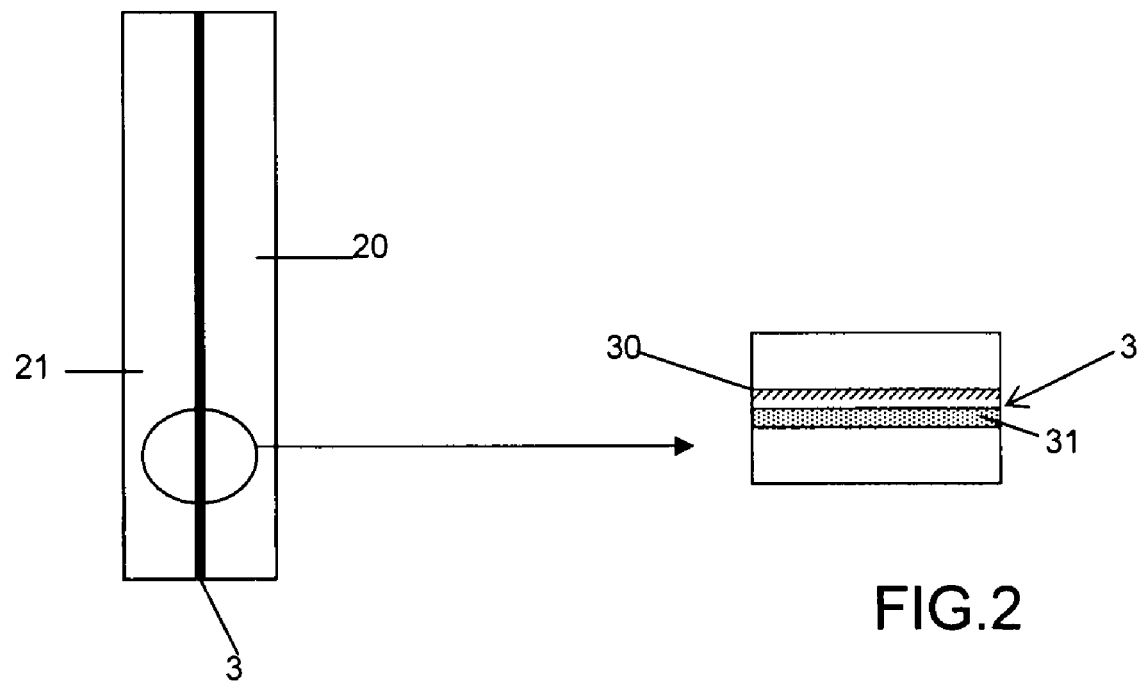

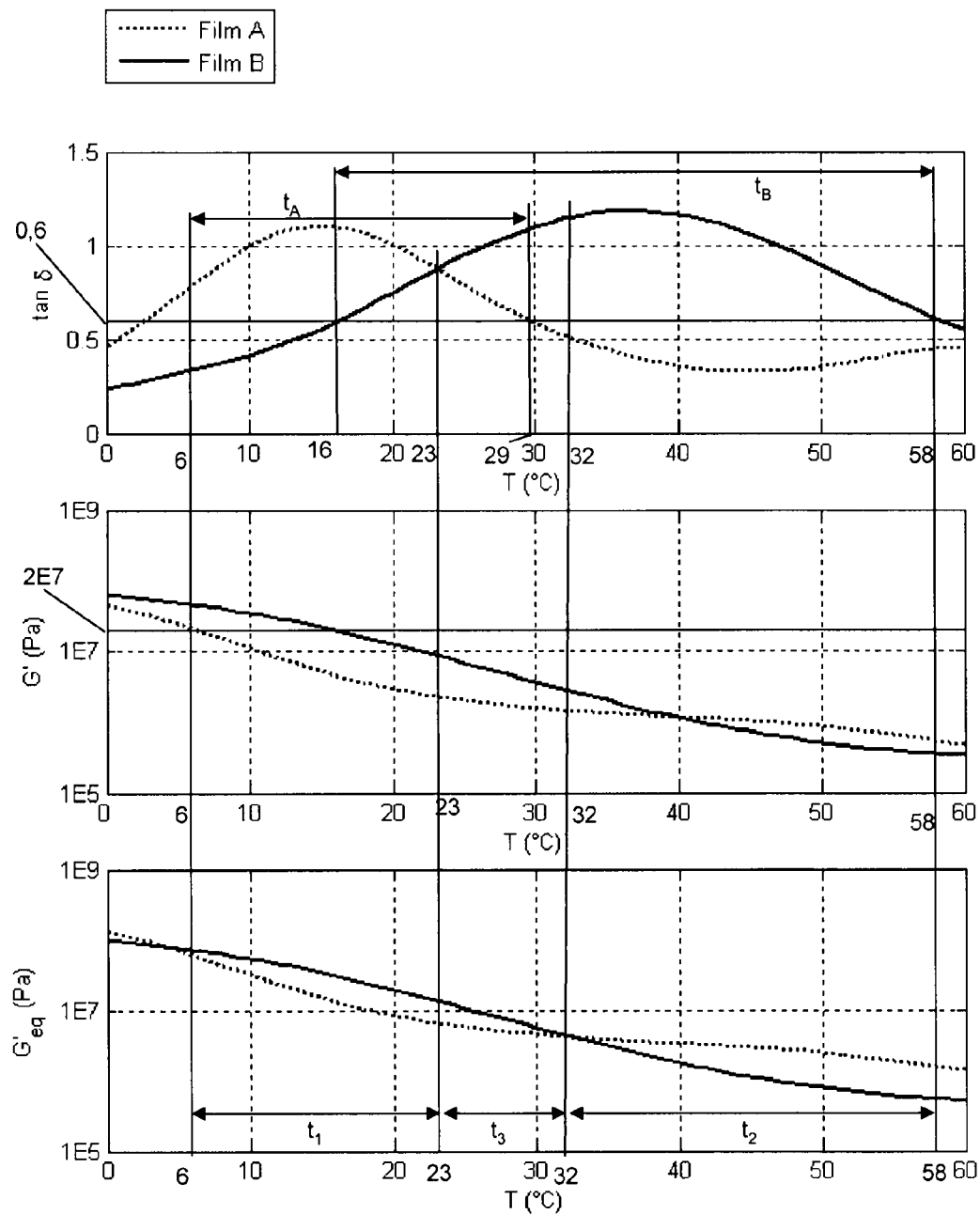

US 7,829,192 B2

ACOUSTIC LAMINATED GLAZING, ACOUSTIC INTERLAYER AND METHOD FOR SELECTING THE INTERLAYER FOR OPTIMAL ACOUSTIC DAMPING

CROSS-REFERENCE TO RELATED APPLICATIONS

This application is a National Stage of PCT/FR07/051246, filed May 10, 2007. This application also claims priority to French patent application 06/51849 filed May 19, 2006, the entire contents of which are incorporated herein by reference.

FIELD OF THE INVENTION

The invention relates to an insert having an acoustic damping property for incorporation in laminated glazing, intended in particular for vehicles, particularly for motor vehicles.

BACKGROUND OF THE INVENTION

Among all the qualities contributing to comfort in modern means of transport, such as trains and motor vehicles, silence has become the determining factor.

Acoustic comfort has been improved now over several years, by dealing with noise, such as noise from the engine, tyres or suspension, and this at their source or during their propagation through the air or solids, by means for example of absorbent coatings or elastomeric connecting components.

The shapes of vehicles have also been modified in order to improve penetration through the air and to reduce turbulence that is itself the source of noise.

For several years, emphasis has been given to the role that glazing can play in improving acoustic comfort, in particular laminated glazing having plastic film inserts. Laminated glazing has moreover other advantages such as the elimination of the risk of flying fragments in the case of sudden breakage, so as to delay breakage.

It has been demonstrated that the use of standard plastic films in laminated glazing is not suitable for improving acoustic comfort. Specific plastic films have thus been developed that have damping properties, enabling acoustic comfort to be improved.

In the following description, reference to a damping film relates to a viscoelastic plastic film that provides improved damping of vibrations in order to give glazing the function of noise reduction.

It has been shown that the acoustic performance of glazing depends on the value of the loss factor tan δ of the material constituting the insert film. The loss factor is the ratio between the energy dissipated in the form of heat and the energy of elastic deformation. It characterises the capacity of the material to dissipate energy. The higher the loss factor, the greater the energy dissipated, and therefore the more the material plays its damping role.

This loss factor varies according to temperature and frequency. For a given frequency, the loss factor reaches a maximum value at a temperature called the glass transition temperature.

The materials used as inserts for laminated glazing are viscoelastic plastic films, of the acrylic polymer or acetal resin type for example, which have a quite high loss factor, such that is at least greater than 0.6 for a given temperature range and for a given frequency range.

In order to provide damping properties enabling acoustic comfort to be improved, some patents have revealed the necessity, apart from having a loss factor greater than a threshold value, of preventing a sudden fall in the loss factor at the coincidence frequency (typically at around 2000 Hz) specific to the composition of the laminated glazing. In order to arrive at this, U.S. Pat. No. 5,190,826 shows the association of at least two insert films or the combination of two materials in order to constitute an insert film, such that each of the films or materials consists of a distinct polyvinyl acetyl resin mixed with a plasticizer. This association of two specific types of resin would make it possible to provide damping over a wide temperature range.

U.S. Pat. No. 5,796,055 also describes the combination of two films that have a high damping property (high loss factor tan δ) over two distinct temperature ranges so as to obtain laminated glazing which provides acoustic performance over a wider temperature range.

Although effectively, when two films, exhibiting improved damping properties over two distinct temperature ranges are combined, the insert finally obtained can provide the laminated glazing with high damping over a more extended range of temperatures than the latter taken separately, but on the other hand this combination does not necessarily lead on the one hand to optimized damping over this more extended temperature range and, on the other hand, it is not invariably efficient.

BRIEF SUMMARY OF THE INVENTION

It could easily be thought that the combination of two films, each exhibiting high damping over two distinct temperature ranges, will invariably lead to obtaining an insert exhibiting damping that is at least as high over each of the temperature ranges than that of the film exhibiting the greatest damping.

Now, the inventors have demonstrated that the resulting insert does not necessarily exhibit such efficient damping and that the latter could even be close to the film exhibiting the smallest damping, which does not lead to an improved damping property.

It has indeed been demonstrated that the combination of two materials only meeting a loss factor higher than 0.6 for two distinct temperature ranges, such as described in the prior art, would not necessarily be suitable for obtaining an efficient insert over the total of the two temperature ranges.

Consideration has been given for example to an insert consisting of the association of two damping films by lamination: a polyvinyl butyral film with the trade name S-Lec Acoustic Film HI-RZN12 from Sekisui with a thickness of 0.76 mm, this film exhibiting a glass transition peak around 10° C. g at 200 Hz, and a polyvinyl butyral film with the trade name Saflex RC41 from Solutia with a thickness of 0.76 mm, this film having a glass transition peak around 40° C. at 200 Hz.

It has been verified that the damping property providing an improvement to the acoustic comfort provided by the insert to the glazing is not invariably as great as that obtained by each of the films at the two respective glass transition temperatures for which the films are most damping, around 10° C. and around 40° C. respectively. To this end, the loss factors of the insert resulting from the association by lamination of the two films as well as those loss factors of the films taken separately have been measured with a viscoanalyzer.

The viscoanalyzer is an apparatus which enables a sample of material to be subjected to deformation stresses under precise temperature and frequency conditions, and in this way to obtain and process all the rheological quantities characterizing the material. Processing the raw data from force and displacement measurements, as a function of frequency, at each temperature, makes it possible to trace curves of the loss factor tan δ as a function of frequency and for various temperatures. The Metravib viscoanalyzer only provides values over the frequency range 5 to 400 Hz. Also, when it is necessary to trace curves at frequencies beyond 400 Hz or at other frequencies than those at which a measurement has been made, or at temperatures other than those at which a measurement has been made, use is made, in a known manner, of the law of frequency/temperature equivalence established by the WLF (William-Landel-Ferry) method.

The loss factor tan δ for each of the films and for the combination of both, has therefore been estimated by a Metravib viscoanalyzer, for a frequency of 200 Hz and at temperatures of 10° C. and 40° C. These values have been given in the following table:

| tanδ | 10° C. | 40° C. |
|---|---|---|
| Sekisui S-Lec Acoustic Film HIRZN12 0.76 mm | 1.00 | 0.34 |
| Solatia Saflex RC41 0.76 mm | 0.14 | 1.01 |
| Insert consisting of both films | 0.88 | 0.43 |

Considered alone, it is found that the Sekisui film acts as a damper at 10° C. (1.00) and not at 40° C. (0.34), while the Solutia film acts as a damper at 400 (1.01) and not at 10° C. (0.14).

Although at 10° C., the loss factor of the insert consisting of two films is very high (0.88), as it is with the Sekisui film (1.00), which has the higher loss of the two films taken separately, on the other hand, while the Solutia film has a very high loss factor (1.01) at 40° C., the insert consisting of both films has a much lower loss factor (0.43), relatively close to that of the Sekisui film at this same temperature, and does not therefore act as a damper.

Consequently, if each of the two films can act as a damper at two distinct temperatures, the combination of the two does not necessarily imply that a damping insert is obtained at each of the two temperatures and the anticipated effect is not there.

In addition, this combination that does not necessarily provide the desired acoustic performance, involves an increase in the thickness of the insert, the use of two distinct materials, and employment of the method for obtaining this combination, which cannot proceed for the assembly without an increase in the cost of the finished product.

Also, it may be preferable to use only one damping film, which indeed will only be operational over a restricted temperature range, but will nevertheless provide very good performance, whereas opting for a plurality of materials or films will increase the quantity of material and the thickness of the insert without for all that leading to efficiency over a wider temperature range.

In fact, an increase in the quantity of materials in an insert will only actually be justified if the performance is reached over all the temperature ranges for which damping is obtained for each of the materials.

In addition, concerning the incorporation of a damping insert into laminated glazing, it has been described that the loss factor tan δ should not be considered alone but that the shear modulus G' constitutes another characteristic to be taken into account in the damping property of the insert. Patent EP 844 075 has demonstrated that for damping vibrations, in particular of solid origin (typically frequencies lower than 300 Hz), the insert of the laminated glazing should meet particular values as regards the shear modulus G' and the loss factor tan δ. It will be recalled that the shear modulus G' characterizes the rigidity of the material; the higher G', the stiffer the material is, and the lower G', the more flexible the material is. Shear modulus depends on temperature and frequency. The shear modulus G' is also estimated with the aid of a viscoanalyzer.

The object of the invention is therefore to provide laminated glazing comprising an insert comprising at least two associated films or two joined materials, each constituting a damping film or material, so that the resulting insert is effective not only over a wide temperature range but also that it has optimum damping performance over this entire temperature range.

According to the invention, the glazing comprises at least two glass sheets and an insert arranged between the glass sheets, the insert comprising at least two damping films made of two materials, A and B respectively, so that these two materials have, over two temperature ranges $t_A$ and $t_B$ respectively, a loss factor tan δ greater than 0.6 and a shear modulus G' less than $2 \times 10^7$ Pa, and is characterized in that the insert provides an optimum improvement to acoustic comfort obtained by the glazing over at least two distinct temperature ranges $t_1$ and $t_2$ included respectively within the two temperature ranges $t_A$ and $t_B$, and in that the film which has, at a frequency of 200 Hz and for each of the two temperature ranges $t_1$ and $t_2$, the highest loss factor tan δ, has an equivalent shear modulus $G'_{eq}$, such that $$G'_{eq} = G' \frac{e_{tot}}{e}$$

where G' is the shear modulus of the material constituting the film, e is the thickness of the film and $e_{tot}$ the total thickness of the insert, which is less than the equivalent shear modulus or moduli of the other film or films.

Distinct temperature ranges are understood to mean ranges that extend differently between two temperature values, the temperature ranges not overlapping.

Thus, it is not only necessary for each of the films to act as a damper within its corresponding temperature range (tan δ greater than 0.6) and that the shear modulus of the material is less than $2 \times 10^7$ Pa, but it is necessary for the film that exhibits more damping within the corresponding temperature range, to have an equivalent shear modulus that is lower than the others. In this way, the insert will have a similar behaviour to that of the film that is most damping over each temperature range. The insert will in this way provide optimum damping over each temperature range for which each of the films constituting the insert plays an optimum damping role.

According to one feature, over the temperature range $t_3$ separating the non-overlapping ranges $t_1$ and $t_2$, the ratio between the equivalent shear moduli of the films lies between 0.2 and 5 so as also to provide optimum acoustic comfort over this temperature range.

Preferably, the insert of the glazing has a shear modulus G' less than $2 \times 10^7$ Pa and a loss factor tan δ greater than 0.6 at a frequency of 200 Hz and over at least the two distinct temperature ranges $t_1$ and $t_2$ and also advantageously over the common temperature range $t_3$.

According to one embodiment, the materials are coextruded in order to form the insert. As a variant, they are laminated.

Such a type of glazing can equally well be used in a vehicle such as a motor vehicle, an aeroplane, a boat or a train, as it can in a building.

The invention also relates to a viscoelastic plastic insert such that it comprises at least two damping films made of two materials, A and B respectively, so that each of these materials has, over a temperature range $t_A$ and $t_B$ respectively, a loss factor tan δ greater than 0.6 and a shear modulus G' less than $2 \times 10^7$ Pa, characterized in that the film which has the highest loss factor tan δ for a given temperature range included within the two temperature ranges $t_A$ and $t_B$ and at a frequency of 200 Hz, has an equivalent shear modulus G' eq, such that $$G'_{eq} = G' \frac{e_{tot}}{e}$$

where G' is the shear modulus of the material constituting the film, e is the thickness of the film and $e_{tot}$ the total thickness of the insert which is less than the equivalent shear modulus or moduli of the other film or films for said temperature range.

Preferably, over the temperature range $t_3$ separating the two distinct ranges $t_1$ and $t_2$, the ratio between the equivalent shear moduli of the films lies between 0.2 and 5.

This insert preferably has a shear modulus G' less than $2 \times 10^7$ Pa and a loss factor tan δ greater than 0.6 over the two temperature ranges $t_A$ and $t_B$. It advantageously has an optimum damping property for the acoustic comfort of the product for which it is intended.

According to one characteristic, the films are laminated, or the assembly of the films is effected by coextrusion of the materials.

The invention finally relates to a method for selecting an insert with a view to incorporating it into a laminated glazing panel to provide the glazing panel with acoustic damping properties, the insert comprising a plurality of damping films made respectively of distinct materials such that these materials have, over at least two temperature ranges $t_A$ and $t_B$ respectively, a loss factor tan δ greater than 0.6 and a shear modulus G' less than $2 \times 10^7$ Pa, characterized in that each of the films is chosen so that, over at least two distinct temperature ranges $t_1$ and $t_2$, included within the two temperature ranges $t_A$ and $t_B$ respectively, and at a frequency of 200 Hz, the film which has the highest loss factor tan δ for each given temperature range $t_1$ and $t_2$, has an equivalent shear modulus $G'_{eq}$ such that $$G'_{eq} = G' \frac{e_{tot}}{e}$$

where G' is the shear modulus of the material constituting the film, e is the thickness of the film and $e_{tot}$ the total thickness of the insert, which is less than the equivalent shear modulus or moduli of the other film or films for said temperature range.

According to one feature, over the temperature range $t_3$ separating the two distinct ranges $t_1$ and $t_2$, the ratio between the equivalent shear moduli of the films lies between 0.2 and 5 so that the acoustic comfort can be optimum over this temperature range.

Preferably, the insert has a shear modulus G' less than $2 \times 10^7$ Pa and a loss factor tan δ greater than 0.6 over the two temperature ranges $t_A$ and $t_B$ and in particular over the two distinct ranges $t_1$ and $t_2$ and advantageously over the separating range $t_3$.

According to another feature, after selecting the films, the films are brought together to form an insert that is incorporated in a laminated glazing panel that is intended in particular for a building or a vehicle.

Other features and advantages of the invention will now be described with reference to the drawings in which:

BRIEF DESCRIPTION OF THE SEVERAL VIEWS OF THE DRAWINGS

FIG. 1 is a partial sectional view of glazing according to the invention.

FIG. 2 is a detailed view of FIG. 1.

FIG. 3 shows measured curves of the loss factor tan δ of each of the films as a function of temperature and at a frequency of 200 Hz.

FIG. 4 shows measured curves of the shear modulus of each of the films as a function of temperature and at the frequency 200 Hz.

FIG. 5 shows measured curves of the equivalent shear modulus $G'_{eq}$ of each of the films as a function of temperature and at the frequency 200 Hz.

DETAILED DESCRIPTION OF THE INVENTION

FIG. 1 illustrates laminated glazing 2 comprising at least two glass sheets 20 and 21 and a damping insert 3 which gives the glazing a damping property that improves acoustic comfort. This glazing, incorporated for example in a vehicle makes it possible to reduce noise due to vibrations originating in solids and/or in the air that are transmitted through the glazing.

FIG. 2, which is a detailed view of FIG. 1, shows the combination of several films, here two films 30 and 31, constituting the insert 3. Each of the films with a thickness $e_A$ and $e_B$ respectively consists of a distinct viscoelastic material A and B respectively.

The insert has been obtained by laminating the films or by coextruding the materials.

The association of the insert with glass sheets is made in a known manner by stacking glass sheets and the insert and by passing the assembly into an autoclave.

At a frequency of 200 Hz, the material A has a loss factor tan δ greater than 0.6 and a shear modulus less than $2 \times 10^7$ Pa over a temperature range $t_A$, whereas the material B has a loss factor tan δ greater than 0.6 and a shear modulus less than $2 \times 10^7$ Pa over another temperature range $t_B$, it being possible for the temperature ranges $t_A$ and $t_B$ to overlap or not.

These two materials are thus chosen for their damping (tan δ>0.6) and their flexibility (shear modulus G' of each material less than $2 \times 10^7$ Pa) over two temperature ranges $t_A$ and $t_B$ respectively.

Now, the power of the insert to absorb vibrational energy will be greater or less according to its thickness and therefore according to the thickness of each of the films. The inventors have thus demonstrated that the loss factor tan δ and the shear modulus of the material should not be taken into account alone in order necessarily to ensure that the glazing provides acoustic comfort, but that the ratio of the equivalent shear moduli between each film over each temperature range should be taken into account.

It will be noted that $G'_{eq}$ is the equivalent shear modulus such that $$G'_{eq} = G' \frac{e_{tot}}{e}$$

where G' is the shear modulus of the material constituting the film, e is the thickness of the film and $e_{tot}$ the total thickness of the insert.

According to the invention, over the temperature ranges $t_A$ and $t_B$, at least two distinct temperature ranges $t_1$ and $t_2$ are considered that are included respectively within the temperature ranges $t_A$ and $t_B$, as well as a temperature range $t_3$ that corresponds to the range separating the two distinct temperature ranges $t_1$ and $t_2$.

According to the invention, it is necessary that, at 200 Hz, the film having the highest loss factor tan δ (the most damping material) over each of the temperature ranges $t_1$ and $t_2$ considered, additionally has an equivalent shear modulus $G'_{eq}$ less than the equivalent shear modulus or moduli of the other film or films constituting the insert.

Thus, the film 30 of thickness $e_A$ which has a loss factor tan δ greater than that of the film 31 over the range $t_1$, has an equivalent shear modulus $G'_{eq_A}$ less than the equivalent shear modulus $G'_{eq_B}$ of the film 31 of thickness $e_B$.

Also, the film 31 with a thickness $e_B$, which has a loss factor tan δ greater than that of the film 30 over the range $t_2$, has an equivalent shear modulus $G'_{eq_B}$ less than the equivalent shear modulus $G'_{eq_A}$ of the film 30 with a thickness $e_A$.

Again according to the invention, for the separating range of temperatures $t_3$, it is necessary that, at 200 Hz, the ratio between the equivalent shear moduli $G'_{eq}$ of the films lies between 0.2 and 5.

Thus, over the range $t_3$, the ratio between the equivalent shear modulus $G'_{eq_A}$ of the film 30 and the equivalent shear modulus $G'_{eq_B}$ of the film 31 lies between 0.2 and 5.

These combined features of the loss factor, of the shear modulus of the materials constituting the films and the equivalent shear moduli of the films, gives the insert optimum acoustic damping for the glazing over all the temperature ranges $t_1$, $t_2$ and $t_3$; the insert is acoustic over each temperature range.

The following two examples of the films 30 and 31 considered, are respectively a film made of a material A, called Vanceva Quiet QC41 from Solutia, and a film made of a material B, Saflex AC1.2 from Solutia. The film 30 is used at a thickness of 1.6 mm and the film 31 at a thickness 3.3 mm. The insert is obtained by laminating the films.

At 200 Hz, film 30 has a loss factor tan δ greater than 0.6 as well as a shear modulus G' less than $2 \times 10^7$ Pa, between a temperature of 6° C. and a temperature of 29° C. (range $t_A$), with a glass transition temperature at 14° C. (FIGS. 3 and 4).

At 200 Hz, the film 31 has a loss factor tan δ greater than 0.6 as well as a shear modulus G' less than $2 \times 10^7$ Pa, between a temperature of 16° C. and a temperature of 58° C. (range $t_B$), with a glass transition temperature at 38° C. (FIGS. 3 and 4).

It should be noted that all the results of measurements given in the text were obtained by a Metravib viscoanalyser.

The following are considered according to the invention:
the distinct range $t_1$ (from 6° C. to 23° C.) which is included within the range $t_A$ and for which the film 30 acts more as a damper than the film 31;
the range $t_2$ (from 32° C. to 58° C.) which is included within the range $t_B$ and for which the film acts more as a damper than the film 30;
the range $t_3$ (from 23° C. to 32° C.) which separates the ranges $t_1$ and $t_2$.

According to the invention, so that the insert inevitably provides acoustic damping over the distinct ranges $t_1$ and $t_2$, and this in an optimum manner for the glazing, the film 30 has an equivalent shear modulus $G'_{eq_A}$ over the range $t_1$, (from 6° C. to 23° C.), that remains less than the equivalent shear modulus $G'_{eq_B}$ of the film 31 over this same range, while over the range $t_2$ (from 32° C. to 58° C.), the film 31 has an equivalent shear modulus $G'_{eq_B}$ that remains less than the equivalent shear modulus $G'_{eq_A}$ of the film 30. FIG. 5 illustrates the curves of the equivalent shear moduli of the films.

Still according to the invention, for the separating range $t_3$, the ratio between the equivalent shear moduli of each of the films 30 and 31 is included between 0.2 and 5 so that the insert inevitably provides acoustic damping, and this in an optimum manner for the glazing. At 25° C. for example, $G'_{eq_A} = 10^7$ Pa and $G'_{eq_B} = 8 \times 10^6$ Pa, that is $$\frac{G'_{eq_B}}{G'_{eq_A}} = 0.8.$$

Consequently, the acoustic performance of the insert exists over the range $t_1$, as well as over the range $t_2$ and over the range $t_3$.

The loss factor of the insert over the ranges $t_1$, $t_2$ and $t_3$, is greater than 0.6. The table below shows the value of the measured loss factor tan δ at 200 Hz and at temperatures of 10, 20, 30, 40 and 50° C.:

| tan δ | 10° C. | 20° C. | 30° C. | 40° C. | 50° C. |
| --- | --- | --- | --- | --- | --- |
| Insert | 0.7 | 0.9 | 0.7 | 0.7 | 0.7 |

Moreover, the shear modulus G' of the insert is preferably less than $2 \times 10^7$ Pa over these ranges $t_1$, $t_2$, and $t_3$. These features regarding loss factor and shear modulus guarantee the optimum acoustic damping property that the insert gives the glazing. The table below shows the value of the measured shear modulus G' of the insert at 200 Hz and at temperatures of 10, 20, 30, 40 and 50° C.:

| G' (Pa) | 10° C. | 20° C. | 30° C. | 40° C. | 50° C. |
| --- | --- | --- | --- | --- | --- |
| Insert | $1.9 \times 10^7$ | $5.9 \times 10^6$ | $2.6 \times 10^6$ | $1.3 \times 10^6$ | $6.2 \times 10^5$ |

The invention claimed is:

1. A glazing comprising at least two glass sheets and a viscoelastic plastic insert arranged between the glass sheets, said insert comprising at least two damping films, one of the damping films being made of a material A and the other damping film being made of another material B, so that material A has, over a temperature range $t_A$, a loss factor tan δ greater than 0.6 and a shear modulus G' less than $2 \times 10^7$ Pa, and material B has, over a temperature range $t_B$, a loss factor tan δ greater than 0.6 and a shear modulus G' less than $2 \times 10^7$ Pa, wherein the insert provides acoustic comfort to the glazing over at least two distinct temperature ranges $t_1$ and $t_2$, the temperature range $t_1$ being included within the temperate range $t_A$ and the temperature range $t_2$ being included within the temperature range $t_B$, and in that the film which has, at a frequency of 200 Hz and for one of the two temperature ranges $t_1$ or $t_2$, the highest loss factor tan δ, has an equivalent shear modulus $G'_{eq}$, such that $$G'_{eq} = G' \frac{e_{tot}}{e}$$

where G' is the shear modulus of the material constituting the film, e is the thickness of the film and $e_{tot}$ the total thickness of the insert, which is less than the equivalent shear modulus or moduli of the other film or films for said temperature range $t_1$ or $t_2$.

2. The glazing according to claim 1 wherein, over a temperature range $t_3$ between the two distinct temperature ranges $t_1$ and $t_2$, the ratio between the equivalent shear moduli of the films lies between 0.2 and 5.

3. The glazing according to claim 2, wherein the shear modulus G' of the insert is less than $2\times10^7$ Pa and the loss factor tan δ of the insert is greater than 0.6 over the temperature range $t_3$ between the distinct temperature ranges $t_1$ and $t_2$.

4. The glazing according to claim 1, wherein the shear modulus G' of the insert is less than $2\times10^7$ Pa and the loss factor tan δ of the insert is greater than 0.6 over at least the two distinct temperature ranges $t_1$ and $t_2$.

5. The glazing according to claim 1, wherein the films are laminated so as to form the insert.

6. The glazing according to claim 1, wherein the films form the insert by coextrusion of the materials.

7. The glazing according to claim 1, wherein it is used in a motor vehicle.

8. The glazing according to claim 1, wherein it is used in a building.

9. A viscoelastic plastic insert intended to be incorporated between two glass sheets of a glazing panel, comprising at least two damping films, one of the damping films being made of a material A and the other damping film being made of another material B, so that material A has, over a temperature range $t_A$, a loss factor tan δ greater than 0.6 and a shear modulus G' less than $2\times10^7$ Pa, and material B has, over a temperature range $t_B$, a loss factor tan δ greater than 0.6 and a shear modulus G' less than $2\times10^7$ Pa, wherein the film has a high loss factor tan δ for a given temperature range $t_1$ or $t_2$, the temperature range $t_1$ being included within the temperature range $t_A$ and the temperature range $t_2$ being included within the temperature range $t_B$, and at a frequency of 200 Hz, has an equivalent shear modulus $G'_{eq}$, such that $$G'_{eq} = G' \frac{e_{tot}}{e}$$

where G' is the shear modulus of the material constituting the film, e is the thickness of the film and $e_{tot}$ the total thickness of the insert which is less than the equivalent shear modulus or moduli of the other film or films for said temperature range $t_1$ or $t_2$.

10. The insert according to claim 9, wherein, over a temperature range $t_3$ between the two distinct ranges $t_1$ and $t_2$, the ratio between the equivalent shear moduli of the films lies between 0.2 and 5.

11. The insert according to claim 9, wherein it has a shear modulus G' less than $2\times10^7$ Pa and a loss factor tan δ greater than 0.6 over the two temperature ranges $t_A$ and $t_B$.

12. The insert according to claim 9, wherein the films are laminated.

13. The insert according to claim 9, wherein the films are assembled by coextruding the materials.

14. A method for selecting an insert with a view to incorporating it into a laminated glazing panel to provide the glazing panel with acoustic damping properties, said insert comprising at least two damping films, one of the damping films being made of a material A and the other damping film being made of another material B, so that material A has, over a temperature range $t_A$, a loss factor tan δ greater than 0.6 and a shear modulus G' less than $2\times10^7$ Pa, and material B has, over a temperature range $t_B$, a loss factor tan δ greater than 0.6 and a shear modulus G' less than $2\times10^7$ Pa, wherein each of the films is chosen so that, over at least two distinct temperature ranges $t_1$ and $t_2$, the temperature range $t_1$ being included within the temperature range $t_A$ and the temperature range $t_2$ being included within the temperature range $t_B$, and at a frequency of 200 Hz, the film which has a high loss factor tan δ for a given temperature range $t_1$ or $t_2$, has an equivalent shear modulus $G'_{eq}$ such that $$G'_{eq} = G' \frac{e_{tot}}{e}$$

where G' is the shear modulus of the material constituting the film, e is the thickness of the film and $e_{tot}$ the total thickness of the insert, which is less than the equivalent shear modulus or moduli of the other film or films for said temperature range $t_1$ or $t_2$.

15. The method according to claim 14, wherein, over a temperature range $t_3$ between the two distinct temperature ranges $t_1$ and $t_2$, the ratio between the equivalent shear moduli of the films lies between 0.2 and 5.

16. The method according to claim 14, wherein after selecting the films, the films are brought together to form an insert that is incorporated in a laminated glazing panel.

17. The method according to claim 16 applied to a glazing panel of a building or to a vehicle.

* * * * *

UNITED STATES PATENT AND TRADEMARK OFFICE
CERTIFICATE OF CORRECTION

| | | |
|---|---|---|
| PATENT NO. | : 7,829,192 B2 | Page 1 of 1 |
| APPLICATION NO. | : 12/296440 | |
| DATED | : November 9, 2010 | |
| INVENTOR(S) | : Jean-Philippe Boure et al. | |

It is certified that error appears in the above-identified patent and that said Letters Patent is hereby corrected as shown below:

On the title page, item (54) and col. 1, line 1, should read:
--ACOUSTIC LAMINATED GLAZING, ACOUSTIC INSERT AND METHOD FOR SELECTING THE INSERT FOR OPTIMUM ACOUSTIC DAMPING--

Signed and Sealed this
Eighth Day of March, 2011

David J. Kappos
*Director of the United States Patent and Trademark Office*